Nov. 5, 1929.  W. H. DICKERSON  1,734,289
DESICCATION APPARATUS
Filed March 9, 1923
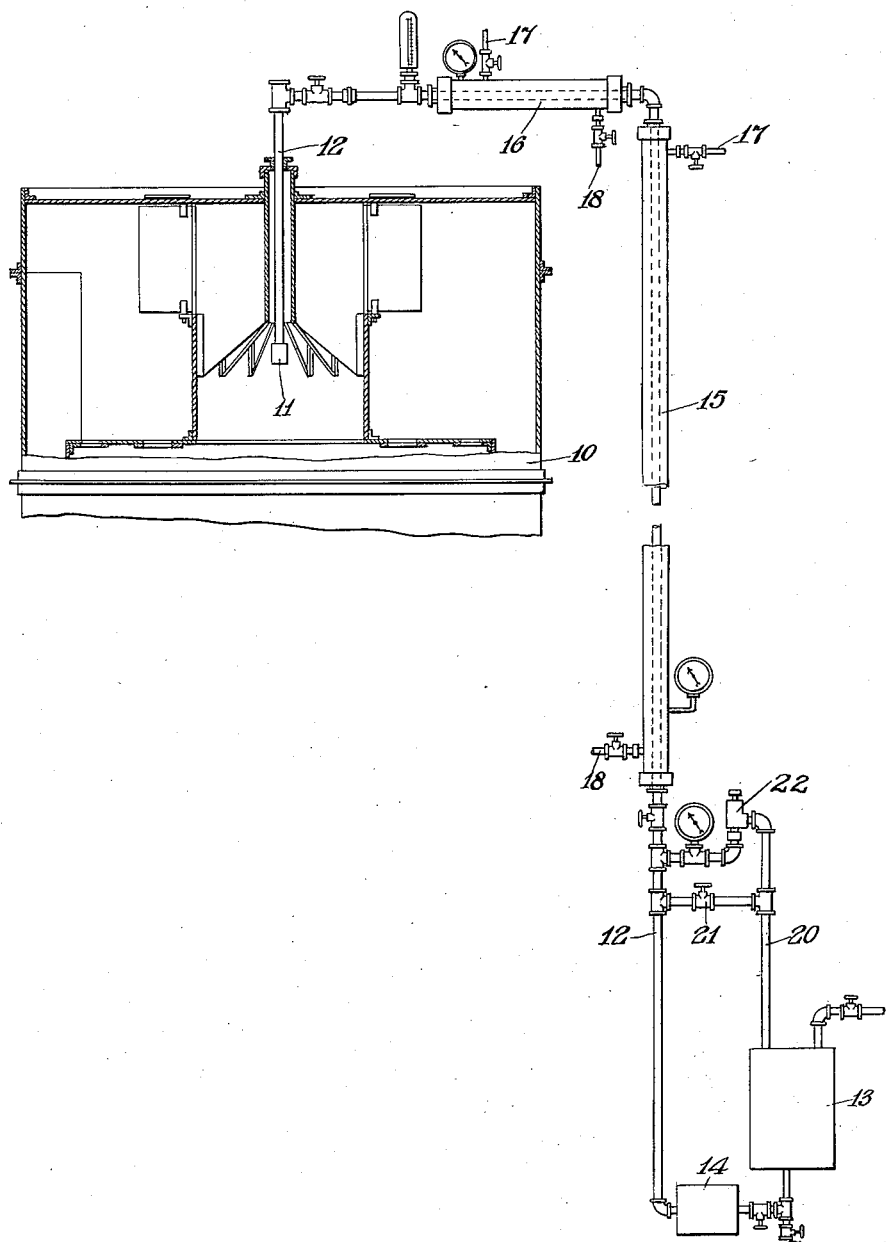
Inventor
Walter H. Dickerson
By his Attorney Patented Nov. 5, 1929

1,734,289

UNITED STATES PATENT OFFICE

WALTER H. DICKERSON, OF EAST ORANGE, NEW JERSEY, ASSIGNOR TO INDUSTRIAL WASTE PRODUCTS CORPORATION, OF DOVER, DELAWARE, A CORPORATION OF DELAWARE

DESICCATION APPARATUS

Application filed March 9, 1923. Serial No. 623,840.

The invention relates to apparatus for desiccating liquids containing solid matter in solution, or in suspension as emulsions and slurries, as by subjecting them in finely divided state to a gaseous moisture absorbing medium; and relates, also, to a novel arrangement of apparatus for effecting the desiccation.

The invention involves more particularly the supply of the solid-containing liquid; and it has for its object to so control the liquid as supplied to the moisture absorbing medium that the said liquid may be provided under conditions which will effect decided changes in the character of the finished product, for example, as regards its specific gravity or weight per cubic foot.

Apparently, it has heretofore not been appreciated that the temperature of the liquor as supplied for desiccation is a factor in the character of the resulting, finished and dry product. I have found, however, that, when the solid-containing liquor is in as hot a condition as possible, the drying of the solid particles thereof is greatly facilitated—an explosive action thereof occuring upon discharge into the desiccating medium and assisting appreciably in the subdivision of the solid-containing liquid whose particles are thereby subjected to an intense initial evaporation. This tends to prevent the formation of hollow particles and facilitates the evaporating action for the production of dense solid particles.

In the atomization of solid-containing liquids, as by secondary fluids such as air or steam, it is difficult to obtain a temperature of the subdivided liquid above the boiling point unless the liquid is first preheated under pressure. On the other hand where the subdivision of the solid-containing liquid is accomplished by spraying under pressure, it is a comparatively simple matter to increase the temperature of the liquid to be sprayed to any desired degree. I have found that very marked results may be obtained by elevating the temperature of such solid-containing liquids above their boiling points at atmospheric pressure. For example, in the production of dry powdered anhydrous sodium sulphate from a solution of the same, by spraying the latter into a gaseous desiccating medium at temperatures ranging between 650° to 750° F., decided changes in the character of the finished product will result from variations in the temperature of the solution as sprayed. With initial temperatures of the gaseous medium as aforesaid and a liquor temperature of 150° F., a product has been obtained weighing approximately 27 lbs. per cubic foot; whereas, if the temperature of the solution being sprayed be increased to 340° F. and the same conditions of the temperature of the gaseous drying medium maintained, a product weighing substantially 34 lbs. per cubic foot is obtained. This effect has been observed on a wide range of materials, but the example given is deemed sufficient as indicative of the general law governing the operation.

Such heating and superheating of the solid-containing liquid is effected conveniently by the apparatus illustrated in the accompanying drawings, in which 10 designates a portion of a desiccating apparatus of well-known or special design and into which there is arranged to be discharged the solid-containing liquid to be desiccated, all of which is well understood and forms no particular part of the present invention. The liquid is finely divided for desiccation by suitable means such as atomizers, centrifugal sprayheads or pressure nozzles of any well-known or special design as the spray nozzle 11, being delivered thereto thru a feed pipe 12 from a suitable source of supply as the tank 13 with a suitable type of pressure feed pump 14 or the like interposed.

The liquid, when ejected thru a spray nozzle, may be subjected to comparatively high pressures, in some instances ranging from 2000 to 3000 lbs. per square inch, and various degrees of superheating of the liquid are thus obtainable. It is furthermore, not feasible generally to superheat the liquid on the suction side of the pressure pump unless sufficient pressure be brought to bear upon the liquid to effect a proper flow thereof to the pump. In accordance with the invention, therefore, the liquid is heated on the discharge side as by passing the solution thru a suitable heater and whereby the temperature of the liquid may be raised to any desired degree. For example, and particularly where high pressures are being employed, the preferred arrangement consists of a steam jacket or jackets 15 and 16 arranged about the supply pipe and substantially between the pump 14 and the entrance of the supply pipe to the desiccating apparatus 10. By means of suitable steam supply and return pipes 17 and 18, the necessary steam may be furnished thereto and the desired temperature of the liquid maintained, so that if the solution is sprayed into the tower, as thru the nozzle 11, a more or less explosive action results in the solid containing liquid and the same is subdivided to a high degree, the extent of the subdivision being a function of the temperatures of the sprayed liquid.

In a co-pending application, Serial No. 611,679, filed by me the 9th day of January, 1923, which has matured into Patent No. 1,648,937, I have disclosed an arrangement in connection with the supply of the liquid to be sprayed by which a predetermined proportion of same may be shunted and returned to the supply tank 13. In providing such excess circulation, accumulation or concentration of sediment in the liquid to be desiccated will be obviated and better operation of the nozzle afforded, as well as clogging of the same prevented. In carrying out such an arrangement, the supply pipe 12 is arranged to be shunted by a return pipe 20 including a pressure operated control valve 22 and a controlling or shut-off valve 21 for regulating the return flow, it being understood, of course, that the latter may be shut off entirely if desired.

When this system of circulating an excess of the liquid over that being sprayed is employed, the preferred arrangement is to heat the liquid, as by steam jacketing the supply pipe, beyond the point where it is by-passed back to the supply tank 13; and the same is so indicated in the drawing. By this arrangement, the pump 14 may handle the liquid to be desiccated at substantially normal temperatures or at temperatures below the boiling point as may be necessary to produce proper fluidity of the solution. In thus arranging the superheating of the solution beyond the by-passing connection, there is obviated self-evaporation of the solution and continuously increasing concentration thereof in the tank 13, as would be the case if the solution were by-passed back to the supply tank 13 in superheated condition.

I claim:—

In desiccation apparatus: a drying tower, means for finely subdividing the liquid to be desiccated and delivering the said liquid to the tower, a feed pipe for supplying liquid to be desiccated to the liquid subdividing means, a feed tank for the liquid to be desiccated with which said feed pipe communicates, pressure producing means interposed in the liquid feed line between the feed tank and the liquid subdividing means, a continuous return connection to said supply tank from the feed pipe beyond said pressure producing means and anterior to said liquid subdividing means for by-passing a controllable portion of the liquid directly to said tank and discharging it freely into said tank through an unrestricted opening, and a pressure regulating means in said return connection for maintaining a constant predetermined pressure on the liquid in the feed pipe supplying the liquid subdividing means, whereby agitation of the liquid in the supply tank is secured and the solid matter of said liquid maintained in suspension and with a uniform concentration thereof as well as clogging of the means for finely dividing the liquid prevented, and means located beyond said continuous return connection for heating only the liquid being delivered to said liquid subdividing means, all of the liquid going through the heater being passed directly to the sub-dividing means without intermingling with any other liquid, whereby only the thoroughly agitated and properly conditioned liquid in exact amount to be immediately delivered to the spray nozzles is heated.

Signed at New York, in the county of New York and State of New York, this 6th day of March, A. D. 1923.

WALTER H. DICKERSON.